United States Patent
Beaulieu et al.

[11] Patent Number: 5,218,402
[45] Date of Patent: Jun. 8, 1993

[54] COLOR IMAGE REPRODUCTION WITH COMPENSATING LIGHT SOURCE

[75] Inventors: Dennis N. Beaulieu, Churchville; Robert L. Horton, Rochester, both of N.Y.

[73] Assignee: Eastman Kodak Company, Rochester, N.Y.

[21] Appl. No.: 761,124

[22] Filed: Sep. 17, 1991

[51] Int. Cl.[5] .................. G03B 27/72; G03B 27/54
[52] U.S. Cl. ................................. 355/38; 355/35
[58] Field of Search ........................... 355/35, 37, 38

[56] References Cited

U.S. PATENT DOCUMENTS

| | | | |
|---|---|---|---|
| 3,765,758 | 10/1973 | Jackson et al. | 355/5 |
| 3,800,070 | 3/1974 | Barbieri | 178/5.2 A |
| 3,825,335 | 7/1974 | Reynolds | 355/1 |
| 4,101,217 | 7/1978 | Fergg et al. | 355/38 |
| 4,124,292 | 11/1978 | Van Wandelen | 355/38 |
| 4,299,451 | 11/1981 | Task et al. | 350/407 |
| 4,519,703 | 5/1985 | Lehman et al. | 355/69 |
| 4,565,441 | 1/1986 | Evans et al. | 355/38 |
| 4,610,538 | 9/1986 | Takenaka | 355/69 |
| 4,676,628 | 6/1987 | Asbury | 355/38 |
| 4,692,794 | 9/1987 | Suzuki | 358/44 |
| 4,809,064 | 2/1989 | Amos et al. | 358/76 |
| 4,812,879 | 3/1989 | Suzuki | 355/38 |
| 4,821,073 | 4/1989 | Backus et al. | 355/68 |
| 4,845,531 | 7/1989 | Nagano | 355/38 |
| 4,888,612 | 12/1989 | Yamamoto | 355/38 |

*Primary Examiner*—Monroe H. Hayes
*Attorney, Agent, or Firm*—Lawrence P. Trapani

[57] ABSTRACT

An apparatus and method for printing a color image from a photographic transparency onto a photosensitive medium is claimed. A plurality of light sources each provide light of a different color when energized. The different color light of each light source has a light intensity level established by an energizing level applied thereto. A light integrator combines the different colored light from the light sources to produce light of a composite color along a primary optical path. The photographic transparency is disposed along the primary optical path such that the composite color light passes through the photographic transparency and produces a projection of the color image from the photographic transparency. An electronic imager is provided for imaging the projected color image of the photographic transparency. A device is provided for exposing the photosensitive medium with the projected color image. A power supply is provided for energizing the plurality of light sources. The power supply provides a first plurality of predetermined energizing levels to the plurality of light sources respectively to produce a first composite color light that substantially compensates for the sensitivity response of the electronic imager. Alternately, the power supply provides a second plurality of predetermined energizing levels to the plurality of light sources respectively to produce a second composite color light that substantially compensates for the sensitivity response of the photosensitive medium.

9 Claims, 7 Drawing Sheets

COLOR IMAGE REPRODUCTION WITH COMPENSATING LIGHT SOURCE

BACKGROUND OF THE INVENTION

1. Technical Field

The present invention relates generally to color image reproduction apparatus including enlarging photographic printers and the like and, more particularly, to improvements in additive and subtractive color light sources for use in such color image reproduction apparatus.

2. Background Art

In state-of-the-art enlarging photographic printers, such as the Kodak Create-A-Print Enlarging Minilab, an additive light source provides "white" light for both a scanning and a printing operation. The additive light source contains three lamps each providing light of a different primary color (i.e., red, green and blue). The primary color light components of the lamps are combined by a light integrating chamber to produce a white light.

For printing, it is necessary to balance the white light to compensate for (1) the transmittance characteristics of a photographic negative to be printed, and (2) the spectral sensitivity response of the printing paper used in the photographic printer. The white light is balanced by adjusting the intensities of the lamp outputs. This is accomplished mechanically by placing rotatable, metal perforated, attenuator wheels in the beam path of each lamp.

An exposure determination system, forming part of the printer, derives the correct angular positions of the attenuator wheels to introduce the proper amount of attenuation in the beam path of each lamp. The white light that results, is properly balanced to compensate for both the negative and printing paper. The exposure determination system includes a video camera having a solid-state, charged coupled device (CCD) type imager, an exposure control computer, and a video monitor for displaying the image to be printed.

During the scanning operation, the video camera receives a projection of an image contained on the negative, as produced by the white light passing through the negative. The camera converts the received image projection to R,G,B color video signals. The signals are then prepared for processing in the exposure control computer. The computer compares the color signal information with stored calibration data and, from this comparison, it determines the transmittance characteristics of the negative. The transmittance data is used by the computer to determine exposure parameters such as classification, subject failure suppression, slope correction, and attenuator wheel positions.

Due to the spectral sensitivity response of the CCD imager in the video camera, errors in determining the transmittance characteristics of the photographic negative are introduced. It was discovered that these errors could only be eliminated by compensating for the spectral sensitivity response of the video camera (as established by the CCD imager).

One approach to compensating for the video camera is to adjust the gains in certain amplifier circuits used in the exposure determination system. This approach had a substantial drawback in that it introduced excessive noise into the system, causing additional errors due to a low signal-to-noise ratio. Another approach is to adjust the balance of the white light using the attenuator wheels in the additive light source. This approach imposed a severe limitation on the range of attenuator wheel positions available for compensation of the negative.

A further compensation approach is to introduce a beam splitter in the optical path of the projected negative image. The beam splitter contains a yellow, partially silvered, reflective coating that enhanced the blue component of the projection being received by the camera. This approach had a disadvantage in that the coating on the beam splitter introduced "color stripe" artifacts on the printing paper during the printing operation.

In addition, the overall intensity of the projected light being received by the video camera and the printing lens is reduced by beam splitting. As a result, the depth-of-field of the video camera is limited, because the camera lens iris must be opened beyond the range of desired aperture settings to compensate for the reduced light. A limitation on the depth of field, in turn, results in a limitation on the sharpness of the image displayed on the video monitor Further, the ability of the printer to scan over-exposed negatives is degraded due to a decrease in light level.

In the original Kodak Create-A-Print Enlarging Minilab, all of the above-mentioned compensation approaches were employed together, with the objective that the drawbacks of each approach could be minimized. This objective was realized. However, these compensation approaches continued to limit the overall system performance of the printer to a degree that was not acceptable to the Eastman Kodak Company.

As indicated, during the printing operation, the attenuator wheels were employed to compensate for both the transmittance of the negative and the spectral sensitivity of the printing paper. This dual compensation role limited the range and resolution of the attenuator adjustments available from the attenuator wheels. Accordingly, it is desirable to have the attenuator wheels devoted to compensating for the photographic negative, and employ some other compensation approach for the printing paper.

SUMMARY OF THE INVENTION

It is therefore an object of the present invention to provide a color image reproduction apparatus and method that avoids the problems associated with the prior art.

It is another object of the present invention to provide a color image reproduction apparatus and method using a compensating light source that significantly reduces the need for mechanical attenuators, optical filters or electronics to compensate for the spectral sensitivity response of each image receiver utilized in said apparatus and method.

It is a further object of the present invention to provide a color image reproduction apparatus and method using a compensating light source that increases the accuracy of the scanning operation and determination of exposure parameters for the printing operation.

It is yet another object of the present invention to provide a color image reproduction apparatus and method using a compensating light source that automatically compensates for the spectral sensitivity response of each image receiver utilized in said apparatus and method.

It is yet a further object of the present invention to provide a color image reproduction apparatus and method using a compensating light source that enables the mechanical or optical attenuator means utilized in said light source to be substantially devoted to spectral compensation for particular photographic transparencies, thus increasing the range and resolution of attenuator adjustments of the attenuator means for such color compensation.

It is still another object of the present invention to provide a color image reproduction apparatus and method using a compensating light source, the operation of which can be optimized for reducing the print time interval during the exposure process of said apparatus and said method.

It is still a further object of the present invention to provide a color image reproduction apparatus and method, using a compensating light source, that allows all of the light to pass to the CCD imager during scanning, and to the print lens during printing, thus permitting: (1) a greater depth of field for the video camera, (2) the display of a sharper image on the video monitor, and (3) improved scanning for over-exposed negatives.

These and other objects are attained in accordance with the present invention wherein there is provided an apparatus for reproducing a color image from a photographic transparency onto first and second image receivers. The apparatus comprises a plurality of light sources each providing light of a different color through a respective beam path when energized. The different color light of each of the light sources has a light intensity level established by an energizing level applied thereto.

A light combiner is optically coupled to the plurality of light sources for combining the different colored light to produce light of a composite color along a primary optical path. The photographic transparency is disposed along the primary optical path such that the composite color light passes through the photographic transparency and produces a projection of the color image from the photographic transparency.

The first and second image receivers are optically coupled to the photographic transparency for receiving the projection of the color image contained on the transparency. The first and second image receivers each have a characteristic spectral sensitivity response.

A power supply is coupled to the plurality of light sources for energizing the light sources. The power supply provides a first plurality of predetermined energizing levels to the plurality of light sources respectively to produce a first composite color light that substantially compensates for the spectral sensitivity response of the first image receiver. The power supply provides a second plurality of predetermined energizing levels to the plurality of light sources respectively to produce a second composite color light that substantially compensates for the spectral sensitivity response of the second image receiver.

A method of printing a color image from a photographic transparency onto a photosensitive medium is also contemplated by the present invention. The method comprises the steps of (1) energizing a plurality of different colored light sources, (2) combining the different colored light from the light sources to produce light of a composite color along a primary optical path, (3) passing the composite color light through the photographic transparency to produce a projection of the color image from the photographic transparency, (4) electronically imaging the projected color image with an electronic imaging means, and (5) exposing the photosensitive medium with the projected color image.

The step of energizing the light sources further comprises (a) providing a first plurality of predetermined energizing levels to the light sources respectively to produce a first composite color light that substantially compensates for the spectral sensitivity response of the electronic imaging means, and (b) providing a second plurality of predetermined energizing levels to the light sources respectively to produce a second composite color light that substantially compensates for the spectral sensitivity response of the photosensitive medium.

BRIEF DESCRIPTION OF THE DRAWINGS

Further objects of the present invention will become apparent from the following description of the preferred embodiments with reference to the accompanying drawings, in which.

DESCRIPTION OF THE PREFERRED EMBODIMENTS

Figure 1:
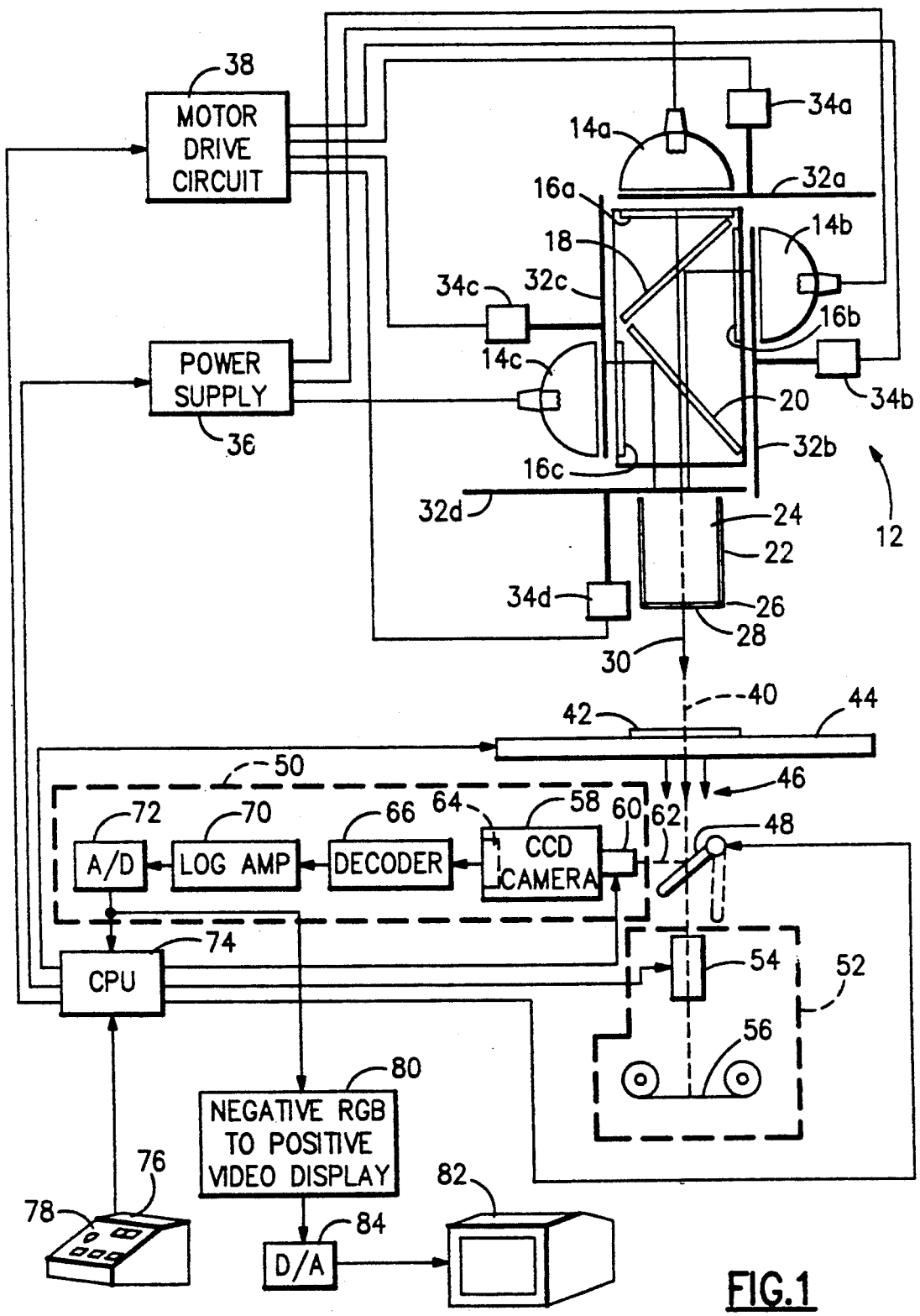
FIG. 1 is a partially schematic view of a color image reproduction apparatus embodying the teachings of the present invention.

Referring to FIG. 1 of the drawings, there is shown an enlarging photographic printer 10 having a compensating, additive, color light source 12, constructed in accordance with the present invention. Light source 12 comprises three lamps 14a, 14b and 14c. In the preferred embodiment, lamps 14a–c are tungsten halogen lamps, having a power input of 225 watts, and a color temperature of approximately 3,000 degrees K at an operating voltage of 68 volts. Lamps 14a–c each have an ellipsoidal reflector associated therewith. Lamps 14a–c comprise, for example, GE Photo-Lamps (ANSI Code EZF-EZJ), manufactured by the General Electric Company.

The light of each lamp is directed along a beam path and is focused at a point approximately 1 inch from the lamp. The light is then filtered by primary color filters 16a, 16b and 16c, respectively. For example, filter 16a is a green filter, 16b is a blue filter, and 16c is a red filter. The white light from lamp 14a is filtered by green filter 16a, thus producing a green light source The green light impinges on the back surface of a yellow filter 18, and passes therethrough, as shown in FIG. 1. The white light from lamp 14b is filtered by blue filter 16b, thus producing a blue light source. The blue light is reflected by the front surface of yellow filter 18, and directed downward along with the green light, as shown in FIG. 1. Both the green and blue light impinge on the back surface of a cyan filter 20, and pass therethrough, as shown in FIG. 1. The white light emitted from lamp 14c is filtered by red filter 16c, producing a red light source. The red light is reflected by the front surface of cyan filter 20, and directed downward in the same direction as the green and blue light.

With further reference to FIG. 1, the red, green and blue light components are received by a light integrator chamber 22. Integrator chamber 22 is made of a folded aluminum sheet material. Integrator chamber 22 has a polished interior surface to cause the light components to be reflected. The light components enter integrator chamber 22 through an aperture 24, which is approximately 2×2 inches square. The light components are reflected by the interior surface of chamber 22 and combined at an output end 26.

Contained within chamber 22 at output end 26 is a diffuser element 28, which is 2×2 inches square and ⅛ inch thick. Diffuser element 28 comprises, for example, a translucent window made of plastic, and is manufactured by the Eastman Kodak Company. The combined red, green and blue light components are mixed through diffuser 28 to produce a composite color light beam 30. Here, the composite color approximates the achromatic color, white.

As shown in FIG. 1, light source 12 also comprises four, metal perforated, attenuator wheels 32a, 32b, 32c and 32d. Attenuators 32a-c are disposed in the beam paths of lamps 14a-c respectively, as shown in FIG. 1. Attenuator wheel 32d is positioned such that it intersects the red, green and blue light components before they enter integrator chamber 22, as shown in FIG. 1. Attenuators 32a-c each contain a distribution of perforations that produces attenuation values ranging from 0 to approximately 1.25 density, in about 0.007 density increments. The distribution of perforations contained in attenuator 32d produces attenuation levels of 0, 0.45, 0.90 and infinity. Thus, white light beam 30 is adjustable over 1.25 Log E for color, and 2.15 Log E for white density. E represents the intensity level of the light being attenuated. Attenuator wheels 32a-d are made of aluminum disks and manufactured by the Eastman Kodak Company. The perforations contained in attenuator wheels 32a-d are produced by punching the aluminum disks in a punch press.

As shown in FIG. 1, attenuator wheels 32a-d are rotated by four stepper motors 34a, 34b, 34c and 34d respectively. Stepper motors 34a-d may comprise VEXTA brand stepper motors, manufactured by the Oriental Motor Company of Japan.

With further reference to FIG. 1, there is shown a lamp power supply 36 and a motor drive circuit 38. Power supply 36 provides electrical power for energizing lamps 14a-c. Power supply 36 will be described in greater detail herein below. Motor drive circuit 38 provides the necessary control voltages to stepper motors 34a-d for positioning attenuator wheels 32a-d respec-
tively. The implementation of circuit 38 is well known to those of ordinary skill in the electrical art.

A photo-electric position sensor (not shown) is coupled to each of attenuator wheels 32a-d. The position sensors detect and provide information on a reference (or "home") position of attenuator wheels 32a-d. This information is used as a reference from which the angular positions of attenuator wheels 32a-d are determined.

As shown in FIG. 1, composite light beam 30 is emitted from integrator 22 along a primary optical path 40. A processed photographic negative 42, containing a color image, is disposed on a rotatable, X-Y translatable support table 44. Photographic negative 42 comprises a photographic transparency, for example, a 135 format color negative. A preferred apparatus for table 44 is shown and described in U.S. Pat. No. 4,774,553 to Blanding et al., entitled, Film Handling Mechanism, assigned to the assignee of the present invention.

Table 44 permits negative 42 to be rotated and positioned in the X-Y plane The X-Y plane is substantially perpendicular to primary optical path 40. Negative 42 is positioned to intersect optical path 40 such that composite light beam 30 is substantially normal to photographic negative 42, permitting light beam 30 to pass directly through negative 42. As composite light beam 30 passes through negative 42, a projection 46 of the color image, or a selected portion of the image, contained on negative 42 is produced and directed along primary optical path 40, as shown in FIG. 1.

As shown in FIG. 1, a pivoting mirror 48 is disposed adjacent to primary optical path 40, and is configured to pivot between a deflecting position (shown in solid lines) and an open position (shown in phantom lines). Pivoting mirror 48 may comprise any suitable mirror for reflecting light. Mirror 48 is actuated by a D.C. gear motor and standard compressible linkage arrangement, not shown. In its deflecting position, mirror 48 is positioned at a 45 degree angle relative to optical path 40, thus causing projected image 46 to be deflected to a scanning system 50. In the open position, pivoting mirror 48 is positioned outside optical path 40, and is not in use. In the open position, projected image 46 is allowed to pass directly to a printing system 52, as shown in FIG. 1.

Printing system 52 comprises an enlarging zoom lens 54 and a roll of photographic printing paper 56, as shown in FIG. 1. Enlarging zoom lens 54 comprises, for example, a Minolta brand zoom lens, modified by the manufacturer to provide an iris that shuts closed and stepper motors to adjust magnification and iris settings. Such zoom lenses are well-known to those skilled in the art. For example, a suitable zoom lens is described in U.S. Pat. No. 4,821,073 to Backus et al., assigned to the assignee of the present invention. Zoom lens 54 provides a means for exposing photographic printing paper 56 with image projection 46.

The magnification and iris settings of zoom lens 54 are automatically adjusted to effectuate a predetermined exposure of printing paper 56. Photographic printing paper 56 comprises, for example, a photosensitive medium such as Kodak Ektacolor 2001 or Ektacolor Edge paper, available from the Eastman Kodak Company. Light source 12, negative 42, zoom lens 54 and paper 56 are disposed along optical path 40 such that zoom lens 54 and light source 12 are situated to print negative 42 onto paper 56.

With further reference to FIG. 1, scanning system 50 comprises a video camera 58 which includes a zoom lens 60. Camera 58 is disposed along a secondary optical path 62 which is at a right angle to primary optical path 40. Video camera 58 contains a solid-state, charge-coupled device (CCD) type imager 64. Camera 58 comprises, for example, a Sony model XC-117 video camera. Zoom lens 60 comprises, for example, a model LP036KD zoom lens available from the Chinon Corp.

While in its deflecting position, pivoting mirror 48 directs color image projection 46 onto zoom lens 60, where it is magnified. The magnified image is electronically imaged by imager 64 and represented at the output of camera 58 by color difference signals R-Y, B-Y, and Y. Scanning system 50 further comprises a decoder circuit 66, connected to the output of camera 58, as shown in FIG. 1. Decoder 66 converts color difference signals R-Y, B-Y and Y to R, G, B video signals. The R, G, B video signals are received by a log amplifier circuit 70, also contained in scanning system 50. Log amplifier circuit 70 converts the R, G, B video signals to log amplified video signals in a manner well known to those skilled in the art. Decoder 66 and log amplifier circuit 70 comprises suitable, commercially available circuits.

The output of log amplifier circuit 70 is converted from an analog to a digital format by an A/D converter circuit 72. The output of A/D converter 72 includes an 8 bit digital representation of each of the R, G, B signals. Each set of digital signals generated by circuit 72 represents a discrete picture element (pixel) within negative 42. These digital signals are received by an exposure control computer 74, as shown in FIG. 1. In the preferred embodiment, computer 74 includes dedicated signal processing hardware that averages adjoining pixels to reduce data. After such signal processing, the scanned image is represented by data corresponding to 80 points on negative 42. The data on these 80 points are used to determine the red, green and blue transmittance of negative 42. The transmittance information is used by exposure control computer 74 to calculate appropriate exposure parameters for negative 42 in a manner well known to those skilled in the art.

One such exposure parameter is the amount of attenuation to be inserted in the beam path of each of lamps 14a-c by attenuator wheels 32a-c. This parameter is determined to compensate for the transmittance of negative 42. In the preferred embodiment, this parameter also takes into consideration paper reciprocity correction, spectral sensitivity compensation for a particular printing paper, and adjustment for process activity of the printing paper.

In prior art systems, attenuator wheels were also the principal means for compensating for the spectral sensitivity of the printing paper and other image receivers, such as a video camera. In contrast, the present invention has eliminated the need for attenuator wheels as the principal compensation means for the printing paper and other image receivers in the printer. This objective is achieved in the preferred embodiment by providing a means for electrically altering the intensity levels of lamps 14a-c to compensate specifically for the spectral sensitivity of the printing paper and video camera. This means is described in detail herein below.

As shown in FIG. 1, computer 74 also controls: (1) the angular positions of attenuator wheels 32a-d via motor drive circuit 38; (2) the electrical power settings applied to lamps 14a-c via power supply 36 (as described in detail below); (3) the positions of table 44; (4) the magnification and iris settings of zoom lenses 54 and 60; and (5) the operational positions of pivoting mirror 48. The central processing unit of exposure control computer 74 comprises, for example, a commercially available microprocessor such as an Intel model 80186 microprocessor available from the Intel Corp.

As shown in FIG. 1, enlarging photographic printer 10 further comprises a console 76, including an operator control panel 78. Control panel 78 is connected to computer 74, permitting an operator to control (through computer 74) various system parameters in printer 10. For example, table 44 and zoom lens 60 are controllable from panel 78. Also, the size of the print to be produced by printing system 52 can be selected from panel 78.

The digital signals produced at the output of A/D converter 72 are also received by a Negative RGB To Positive Video Display circuit 80. Circuit 80 comprises appropriate circuitry for inverting and gamma-correcting the digital signals so as to drive a video monitor 82. Many implementations of circuit 80 are well known to those skilled in the art. Circuit 80 may comprise a look-up table for converting the digital signals to a digital output that represents a positive image display.

The digital output of circuit 80 is converted to an analog representation by a D/A converter 84. The analog output of D/A converter 84 is received by video monitor 82 which converts this output to a visual display of image projection 46. Video monitor 82 comprises a suitable, commercially available color monitor, such as a model 8CM515, available from the Magnavox Corp. Monitor 82 must provide at least an NTSC level of resolution.

As indicated above, one object of the present invention is to provide a composite light source which compensates for the spectral sensitivity response of each image receiver utilized in the printer. In the preferred embodiment, printer 10 contains two image receivers, one being printing paper 56 and the other being video camera 58. Compensation is achieved by providing a means for energizing lamps 14a-c with a first set of predetermined energizing levels for printing paper 56 and a second set of predetermined energizing levels for video camera 58. Preferably, the energizing levels are voltage levels applied across lamps 14a-c. Each set of voltage levels contains a voltage level for each of lamps 14a-c.

Within an operable range, the intensity levels of lamps 14a-c are established by the voltage levels applied thereto. Thus, a predetermined set of voltage levels will produce a predetermined set of intensity levels from lamps 14a-c. Two sets of intensity levels of light emitted from the primary color light sources (i.e., green—lamp 14a and filter 16a; blue—lamp 14b and filter 16b; and red—lamp 14c and filter 16c) are established by two respective sets of voltages. One set of intensity levels compensates for the spectral sensitivity of printing paper 56, and the other set compensates for the spectral sensitivity of video camera 58. The two sets of voltage levels are provided by an energizing means which is described in detail below with reference to FIGS. 6-9.

Figure 2:
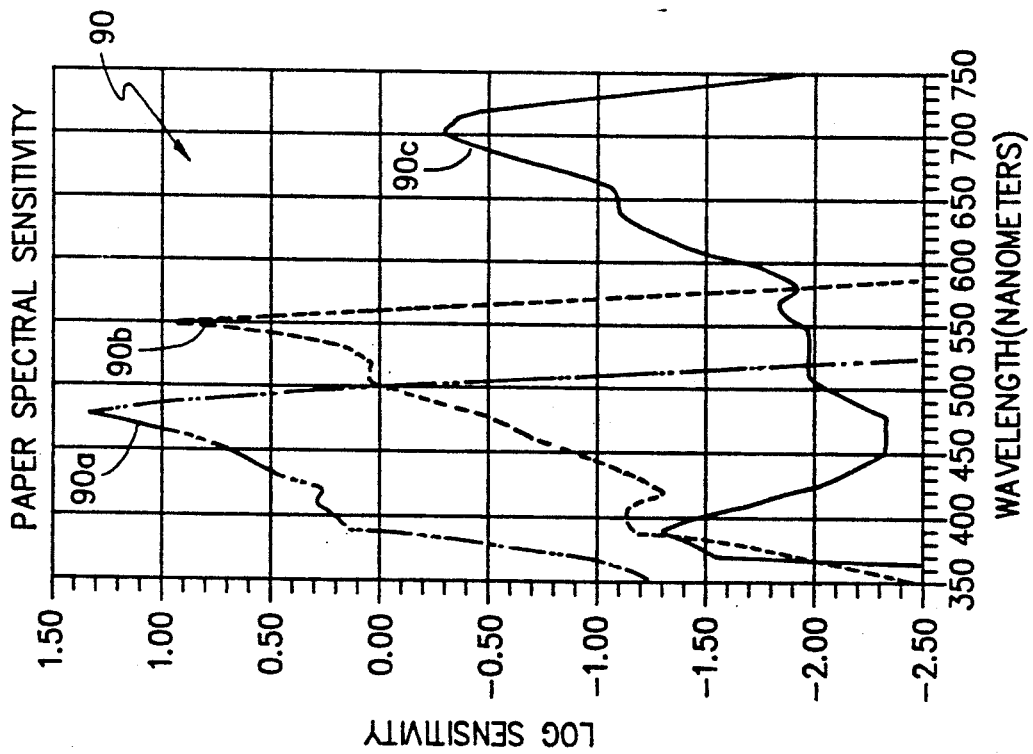
FIG. 2 is a graphic diagram showing the spectral sensitivity response of photographic printing paper used in the apparatus shown in FIG. 1.

The two sets of voltages for lamps 14a-c are determined from measured data. The spectral sensitivity of a sample of the printing paper is measured using a sensitometer, in a manner well known to those of ordinary skill in art. As an example, FIG. 2 shows a measured spectral sensitivity response 90 for the Kodak EKTACOLOR EDGE printing paper. Response 90 is expressed in units of log sensitivity over the wavelength range of 350-800 nanometers. Response 90 comprises three curves 90a, 90b and 90c. Curves 90a, 90b and 90c represent the individual sensitivities of the Red, Green and Blue emulsion layers in the printing paper.

Figure 3:
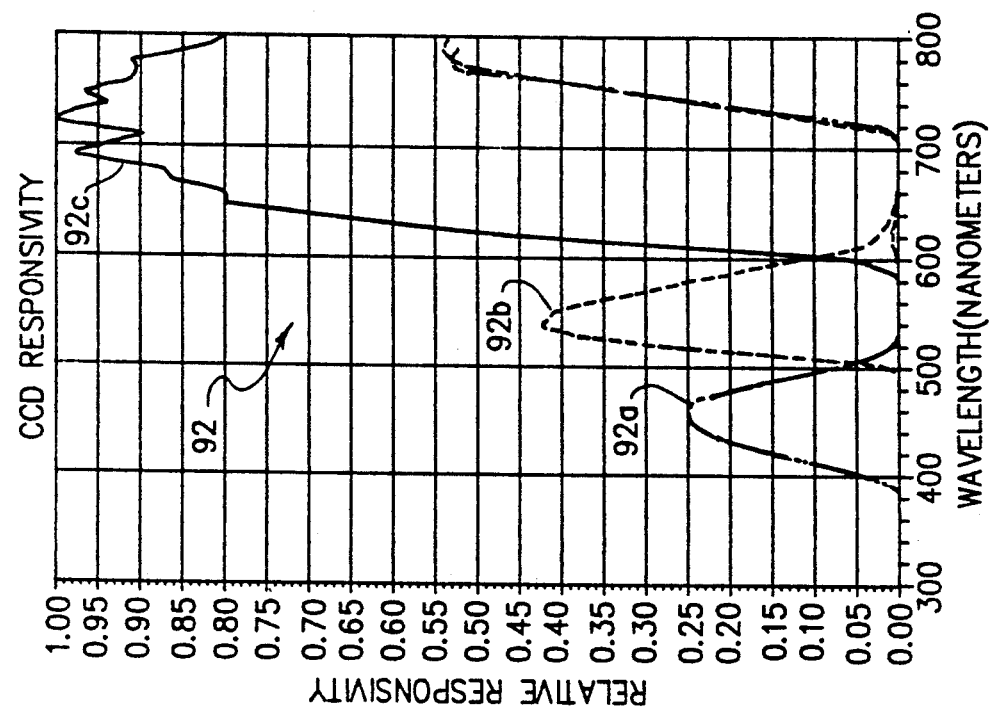
FIG. 3 is a graphic diagram showing the spectral sensitivity response of a CCD imager contained in a video camera which forms part of the apparatus shown in FIG. 1.

The spectral sensitivity of the CCD imager is measured using a monochrometer and sweeping or stepping a test light source through the spectrum of interest. As an example, FIG. 3 shows a measured spectral sensitivity response 92 for the CCD type imager contained in the Sony model XC-117 video camera. The CCD imager establishes the sensitivity response of the video camera. Response 92 is normalized and represents the relative sensitivity of the imager over the wavelength range of 350–800 nanometers. Response 92 comprises three curves 92a, 92b and 92c. Curves 92a, 92b and 92c represent the individual sensitivities of the Red, Green and Blue sensors in CCD imager 64.

Figure 4:
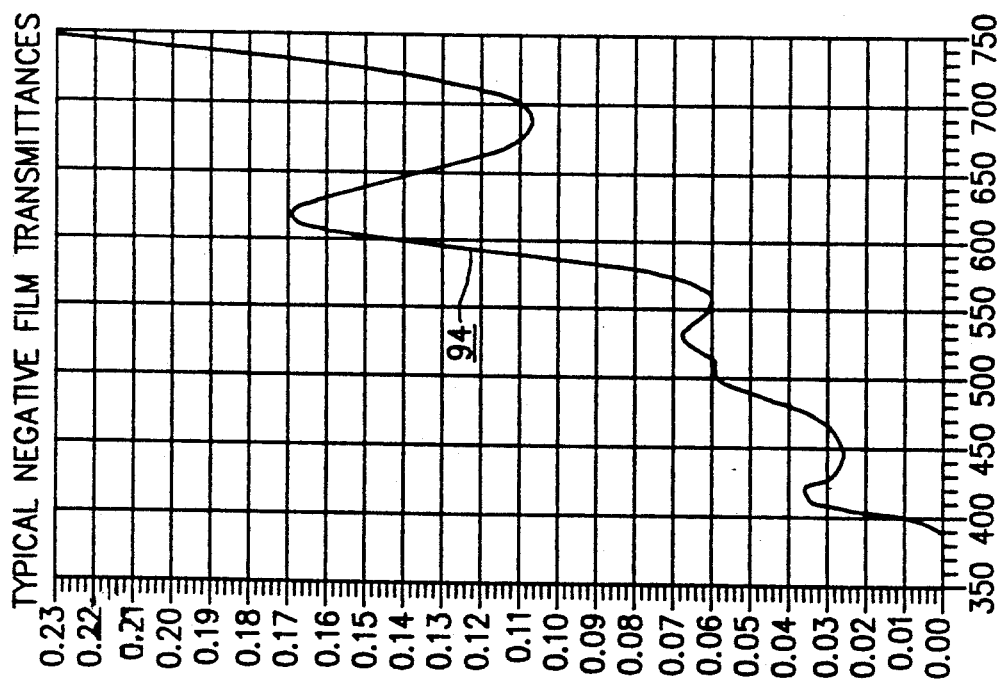
FIG. 4 is a graphic diagram showing the transmittance characteristics for a typical photographic negative to be printed in the apparatus of FIG. 1.

Further, the spectral transmittance of a typical photographic negative is measured by using a spectral radiometer (such as a LICOR 1800 spectral radiometer). As an example, FIG. 4 shows a measured transmittance curve 94 of a typical photographic negative. Actual transmittance values are plotted in FIG. 4. All measurements are obtained by using the same white light source containing red, green and blue light components with equal intensity levels. The light output of the light source is calibrated by also using a spectral radiometer.

The measured data is collected in a computer where two composite response graphs are produced. One composite response graph contains a product of the measured light source intensity, printing paper sensitivity response, and negative transmittance. The other composite response graph contains a product of the measured light source intensity, CCD imager sensitivity response, and negative transmittance. There are three curves in each composite response graph. Each curve is dependent upon a particular chromatic sensitivity in the image receiver (i.e., printing paper or CCD imager).

Figure 5:
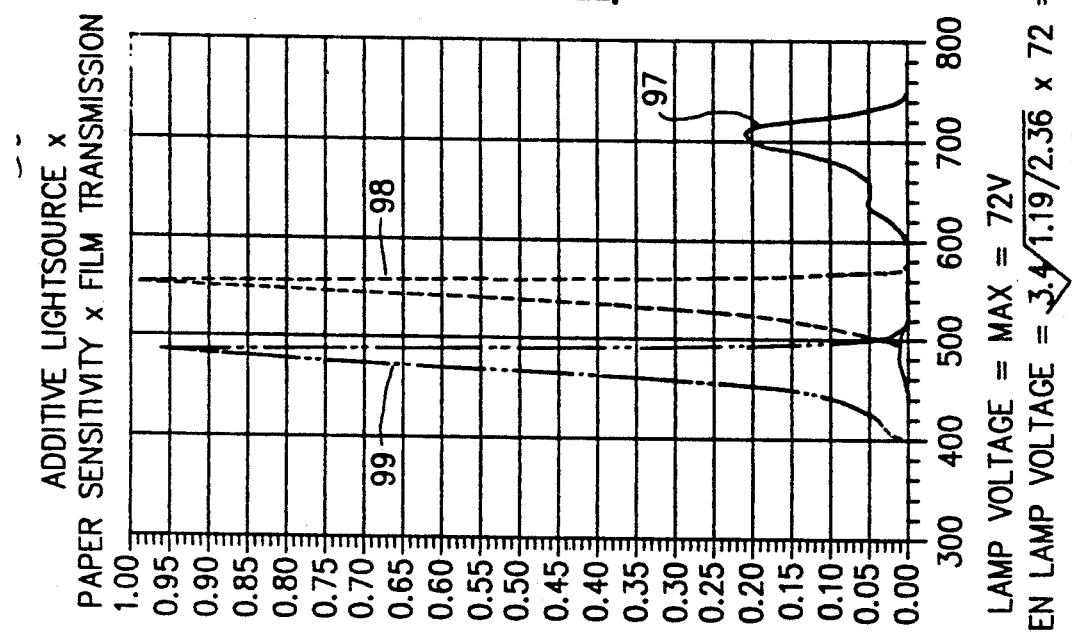
FIG. 5 is a graphic diagram showing a composite response curve of: (a) the light source output, (b) the spectral sensitivity of the printing paper, and (c) the transmittance response of the photographic negative.

An example of a composite response graph is shown in FIG. 5. The composite response graph is a product of measured data on the light source, printing paper and negative. The response graph contains curves 97, 98 and 99 which are dependent upon the Red, Green and Blue emulsion layers of the printing paper.

The lamp voltage calculation will be described with reference to the example shown in FIG. 5. First, the area under each curve (i.e., 97, 98 and 99) is computed. These areas have been computed as follows: Red Area=1.19; Green Area=2.36; and Blue Area=2.59. From these areas, the lamp voltages can be determined using the following relationship:

$$lumens/LUMENS = (volts/VOLTS)^{3.4}$$

The lamp voltage for the red light source is selected to be 72 volts. This level is 4 volts above the typical operating voltage for the GE 225 watt tungsten halogen lamps being used. This level is chosen to ensure adequate compensation for the printing paper in the red frequency band. Also, maximization of the red light component optimizes the composite light source for reducing print times.

Using the above relationship, the green and blue lamp voltages can be calculated as follows:

$$\text{Green lamp voltage} = 3.4\sqrt{1.19/2.36} \times 72 = 58.9 \text{ v}$$

$$\text{Blue lamp voltage} = 3.4\sqrt{1.19/2.59} \times 72 = 57.3 \text{ v}$$

These three lamp voltages will produce red, green and blue light intensity levels that will compensate for the spectral sensitivity response of the printing paper.

The same procedure is followed to determine the lamp voltages for CCD imager compensation, except that the blue lamp voltage is selected to be 68 volts, and the green and red lamp voltages are calculated accordingly. In one example, the lamp voltages for CCD imager compensation were calculated to be: 54 volts for the red lamp, 58 volts for the green lamp, and 68 volts for the blue lamp. These three lamp voltages will produce red, green and blue light intensity levels that will compensate for the spectral sensitivity response of the CCD imager.

Note from FIGS. 2 and 3 that the printing paper is most sensitive to blue light and least sensitive to red light, and the CCD imager is least sensitive to blue light and most sensitive to red light. If compensation for these two very different image receivers is to be achieved with attenuator wheels, it is apparent that wide swings in attenuator wheel positions will be necessary. This approach is especially inefficient where the attenuator wheels must also be employed to compensate for the photographic negative. The present invention substantially liberates the attenuator wheels from the task of image receiver compensation.

Figure 6:
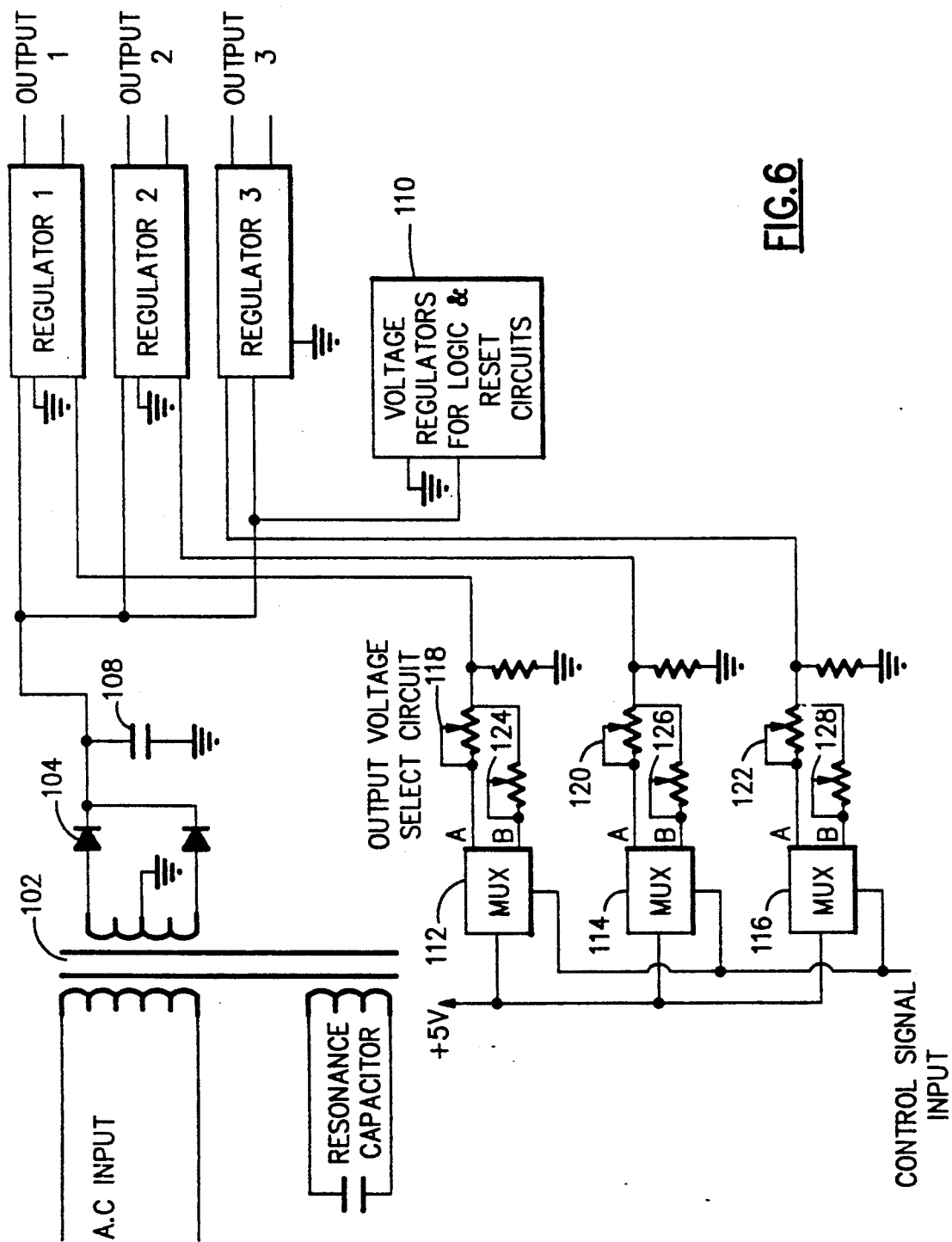
FIG. 6 is a schematic block diagram of the power supply for energizing the compensating light source, constructed in accordance with the present invention.

The means for energizing lamps 14a–c of light source 12 is provided in power supply 36 of FIG. 1. A schematic block diagram of power supply 36 is shown in FIG. 6. Referring to FIG. 6, an A.C. input is applied to a ferroresonant transformer 102 which provides a constant 78 v output voltage over an input range of 190–254 volts. The output of transformer 102 is full-wave rectified by diodes 104 and 106 and filtered to 78 volts D.C. with low ripple (<=1.5 v) by a smoothing capacitor 108. The 78 v D.C. is then reduced to the appropriate lamp voltages by Regulators 1, 2 and 3. The lamp voltages for lamps 14a–c are provided at Outputs 1, 2 and 3 respectively. The 78v D.C. is also reduced by a voltage regulator circuit 110 to provide +23 volts, +13 volts, and +5 volts supplies to the logic and other circuits within power supply circuit 36. Regulator circuit 110 includes electronic circuitry well known to those skilled in the art for providing D.C. regulated voltages for various circuits in a photographic printing system.

With further reference to FIG. 6, there is shown an Output Voltage Select Circuit comprising three multiplexers 112, 114 and 116. Multiplexers 112, 114 and 116 switch between their respective outputs A and B based on the level of a Control Signal Input, as shown in FIG. 6. The multiplexers are supplied with a +5 volts which is received from regulator circuit 110. The +5 volts supply is presented to the active outputs of the multiplexers.

When Control Signal Input is a logic 1, the A outputs of the multiplexers are active and the B outputs are inactive. The voltage levels of active A outputs of multiplexers 112, 114 and 116 may be adjusted by potentiometers 118, 120 and 122 respectively. Potentiometers 118, 120 and 122 will also determine the voltage levels applied to lamps 14a–c, as will be described herein below. When the Control Signal Input is a logic 0, the A outputs of the multiplexers are inactive and the B outputs are active. The voltage levels of the B outputs, and thus the lamp voltages, may be adjusted by potentiometers 124, 126 and 128.

Potentiometers 118, 120 and 122 (at the A outputs) adjust the lamp voltages for the scanning operation. Potentiometers 124, 126 and 128 (at the B outputs) adjust the lamp voltages for the printing operation. If the Control Signal Input is lost, the multiplexers default to enable the A outputs such that the scanning lamp voltages are applied to lamps 14a–c.

Figure 7:
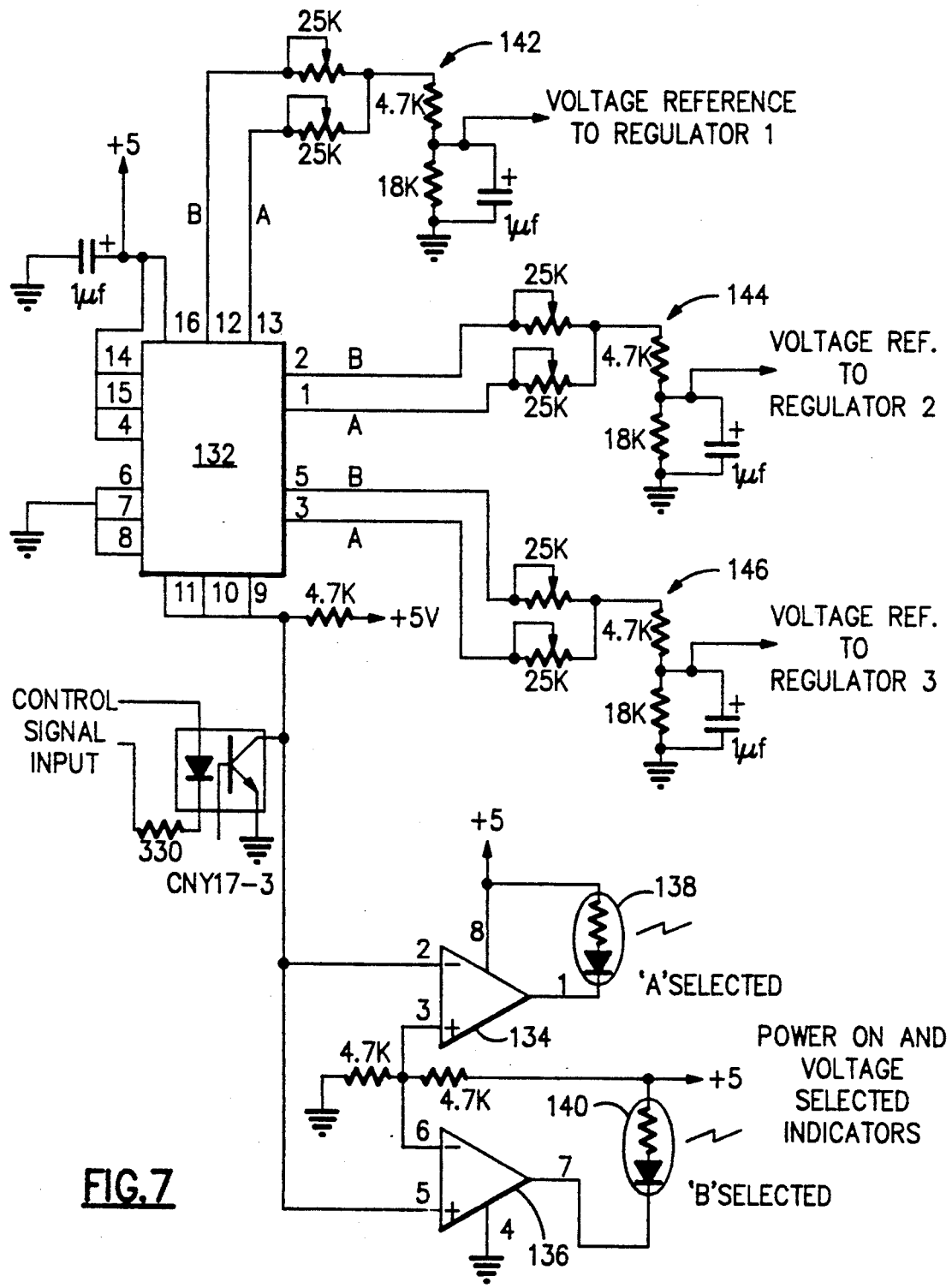
FIG. 7 is a detailed schematic diagram of the output voltage select circuit, forming a part of the power supply shown in FIG. 6, constructed in accordance with the present invention.

A detailed schematic diagram of the Output Voltage Select Circuit is shown in FIG. 7. The Control Signal Input is generated from exposure control computer 74. As shown in FIG. 7, this signal is coupled to the Output Voltage Select Circuit through an optical coupler circuit comprising an opto-coupler CNY17-3. From the optocoupler, the Control Signal Input is routed to an integrated circuit (IC) 132 and to a pair of driver circuits 134 and 136. Driver circuits 134 and 136 drive light emitting diode (LED) indicators 138 and 140 respectively. Indicator 138 is energized when no current flows through the LED of the opto-coupler (CNY17-3), indicating that the scanning voltages are applied to lamps 14a–c. Indicator 140 is energized when current flows through the LED of the opto-coupler (CNY17-3), indicating that the printing voltages are applied to lamp voltages 14a–c.

The multiplexer circuits are implemented by integrated circuit 132. Integrated circuit 132 is a triple single-pole, double-position switch device, such as a Motorola MC54/74HC4053 device. The +5 volts supply to the multiplexers are applied to integrated circuit 132 at pins 14, 15 and 4 respectively. The Control Signal Input is provided to each of the multiplexers through pins 11, 10 and 9 respectively. The A and B outputs of each multiplexer are as indicated in FIG. 7, along with their respective potentiometers. The voltage levels at the outputs of the potentiometers are divided by respective voltage divider circuits 142, 144 and 146. The outputs of these dividers constitute the outputs of the Voltage Select Circuit itself. These outputs are connected to Regulator 1, 2 and 3, as indicated.

Figure 8:
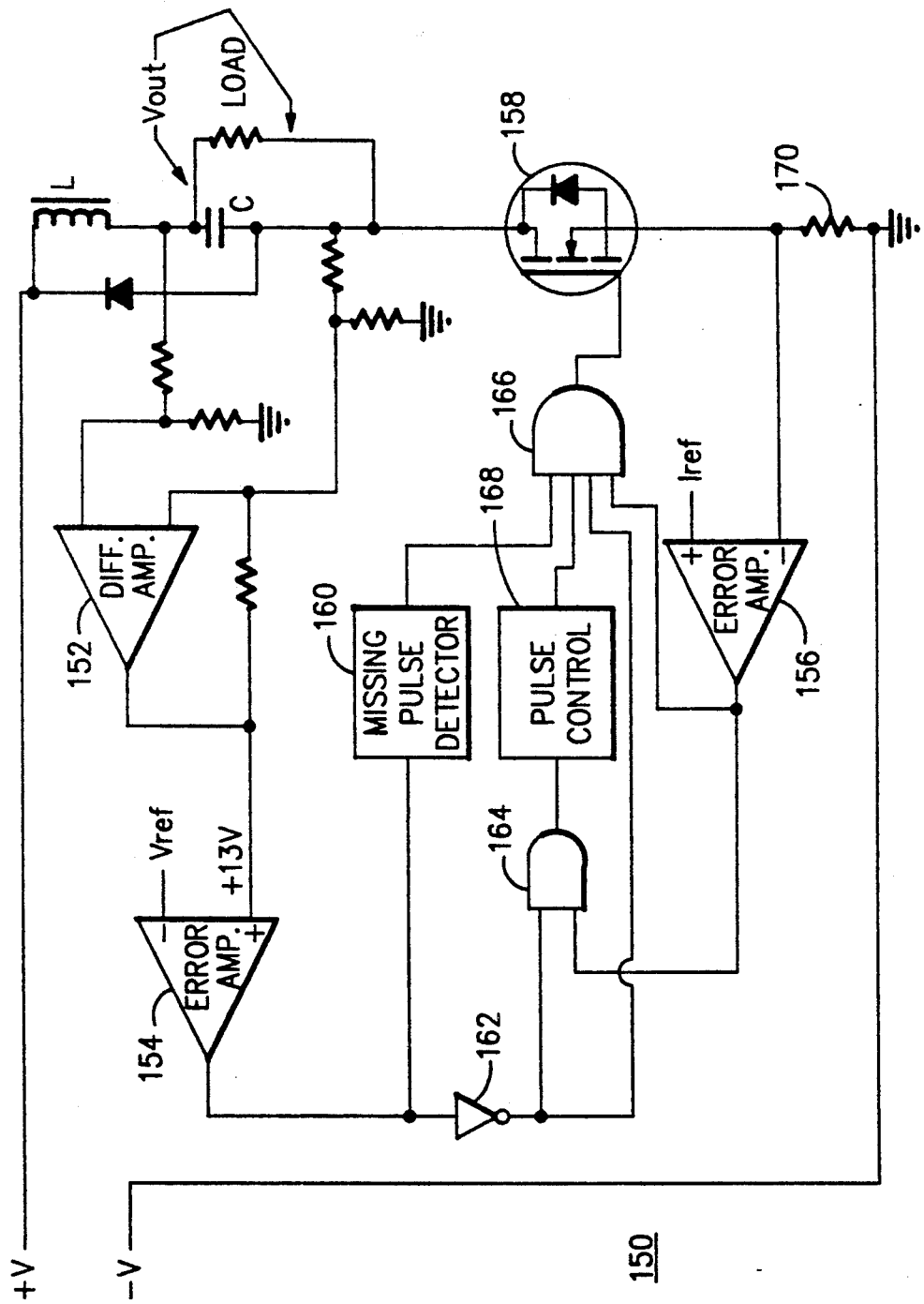
FIG. 8 is a schematic block diagram of one lamp regulator circuit for the compensating light source, constructed in accordance with the present invention.

Referring to FIG. 8, there is shown a schematic block diagram of a lamp regulator circuit 150. Circuit 150 is represented by the box labeled REGULATOR 1 in FIG. 6. Regulators 1, 2 and 3 are identical. Therefore, a description of Regulator 1 is sufficient for understanding 30 Regulators 1, 2 and 3. Referring to FIG. 8, the 78 v D.C. developed from transformer 102 (FIG. 6) is applied to the +V input of circuit 150. The −V input of circuit 150 is tied to ground, as shown in FIGS. 6 and 8. Lamp regulator circuit 150 regulates both the scan and print voltages that are alternately applied to the lamp. For the purpose of describing circuit 150, the desired lamp voltage is assumed to be 72 v.

As shown in FIG. 8, the lamp voltage Vout is divided down and monitored by a differential amplifier 152. Approximately 13 volts at the output of differential amplifier 152 translates to 72 volts across the lamp (indicated by LOAD in FIG. 8). The output of amplifier 152 is connected to the positive input of an error amplifier 154, as shown in FIG. 8. A voltage reference signal, Vref, is applied to the inverting input of amplifier 154. For each lamp regulator, Vref is preset to one voltage level for scanning and to another voltage level for printing. Here, Vref is set to +13 v. Vref is determined from the Output Voltage Select Circuit (FIG. 7), as described with reference to FIG. 9 below.

When the lamp voltage is less than 72 volts, the positive input to error amplifier 154 is less than +13 volts. In response, a logic 0 is generated at the output of amplifier 154. As shown in FIG. 8, the output of error amplifier 154 is connected to the input of a Missing Pulse Detector 160 and an inverter 162. The logic 0 output of amplifier 154 is inverted by inverter 162 to produce a logic 1 at its output. The output of inverter 162 is connected to one input of an AND gate 164 and to one input of an AND gate 166. The logic 0 output of amplifier 154 is also presented to the input of Missing Pulse Detector 160 which, in response, maintains a logic 1 at its output. The output of Missing Pulse Detector 160 is connected to an input of AND gate 166, as shown in FIG. 8.

As shown in FIG. 8, another error amplifier 156 has its non-inverting input connected to a second voltage reference signal, Iref. Iref is established internally within circuit 150, as described below with reference to FIG. 9. Amplifier 156 operates to limit the amount of current flowing through the circuit branch containing the lamp, an inductor L, a capacitor C, and a FET 158. The current limiting function of amplifier 156 will be described in greater detail herein below. It is assumed for the moment that the inverting input to amplifier 156 does not exceed the level of Iref. Therefore the output of amplifier 156 remains at a logic 1.

The output of error amplifier 156 is connected to the other input of AND gate 164 and to an input of AND gate 166, as shown in FIG. 8. As a result of the logic 1 inputs to AND gate 164, its output is also a logic 1. The output of AND gate 164 is connected to a pulse control circuit 168. Pulse control circuit has an output that is maintained at a logic 1 until its input is triggered by a transition to a logic 0. As shown in FIG. 8, the output of pulse control circuit 168 is also connected to an input of AND gate 166. Thus, all inputs to AND gate 166 are a logic 1, resulting in a logic 1 output.

As shown in FIG. 8, the output of AND gate 166 is connected to FET 158. The logic 1 output of AND gate 166 causes FET 158 to turn on. Current flowing through inductor L, capacitor C and the lamp will cause the voltage across the lamp to rise until it reaches 72 volts. At this point, the output of amplifier 152 will slightly exceed Vref and the output of error amplifier 154 will drop to a logic 1. In this case, the output of inverter 162 becomes a logic 0, as does the output of AND gate 164. As the output of AND gate 164 goes low, pulse control circuit 168 is triggered.

When circuit 168 is triggered, its output drops to a logic 0 for approximately 25 microseconds. The logic 0 output of circuit 168 forces the output of AND gate 166 to a logic 0, thus causing FET 158 to turn off. As FET 158 turns off, the voltage across the lamp begins to decrease, causing the output of amplifier 152 to decrease below Vref. At this point, the output of error amplifier 154 changes to a logic 0, causing the output of inverter 162 to change to a logic 1. Thus, AND gate 164 produces a logic 1 output. During this time, Missing Pulse Detector 160 continues to maintain a logic 1 output. The logic 1 output of AND gate 164 is detected by pulse control circuit 168. As a result, the output of pulse control circuit 168 will return to a logic 1 after its 25 microsecond logic 0 period (triggered by the previous logic 0 output of AND gate 164). The logic 0 period of pulse control circuit 168 ensures that FET 158 remains off for a minimum of 25 microseconds.

As indicated above, error amplifier 156 operates to limit the amount of current flowing through FET 158, the lamp, inductor L and capacitor C. Current is measured by sensing the voltage drop across a resistor 170 and comparing it to reference voltage Iref. When the voltage on resistor 170 exceeds Iref, the output of error amplifier 156 drops to a logic 0, forcing the output of AND gate 164 to a logic 0. This output triggers pulse control circuit 168, causing the output of circuit 168 to drop to a logic 0. The logic 0 output of circuit 168 forces the output of AND gate 166 to drop to a logic 0 for a 25 microsecond period. During this period, FET 158 is off. After the 25 microsecond period, the output of pulse control circuit 168 returns to a logic 1 and FET 158 is turned back on. Pulse control circuit 168 is repeatedly triggered with a logic 0 input until the voltage across resistor 170 drops below Iref or a one second period expires, which ever event occurs first.

During the current limiting process, control of Regulator 150 has been taken away from error amplifier 154 because the output of differential amplifier 152 never attains the level of Vref. Missing Pulse Detector 160 monitors the output of amplifier 154 and, after a one second period of no pulses on the output of amplifier 154, the output of Missing Pulse Detector 160 drops to a logic 0, causing FET 158 to turn off. FET 158 remains off until the system is reset by a reset circuit (not shown).

Figure 9:
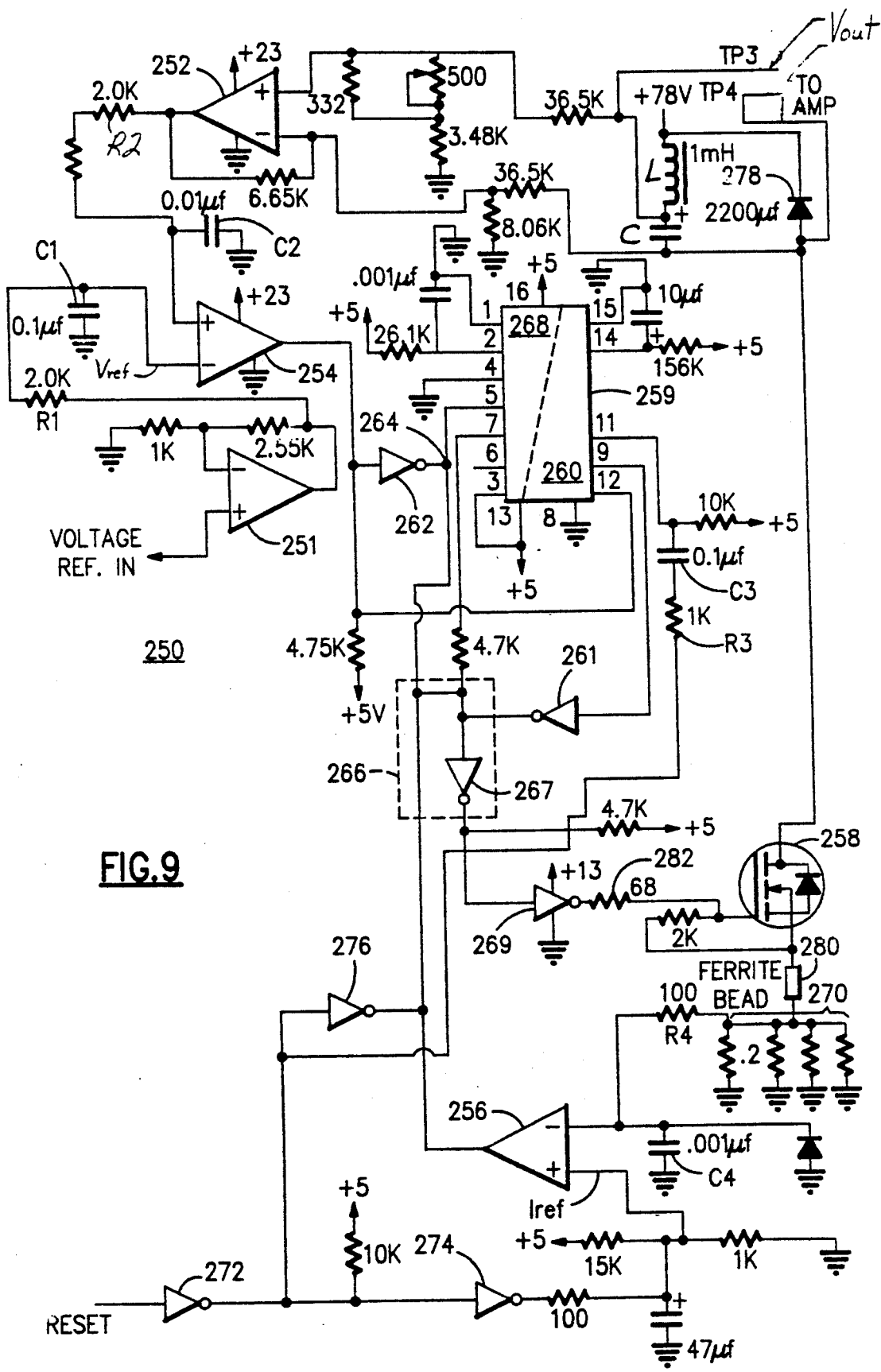
FIG. 9 is a detailed schematic diagram of the lamp regulator circuit shown in FIG. 8.

Referring to FIG. 9, there is shown a detailed schematic diagram of the lamp regulator circuit of FIG. 8. The components in FIG. 9 that correspond to those in FIG. 8 have been labeled with like reference numerals, but increased by a factor of 100. As shown in FIG. 9, a lamp regulator circuit 250 receives the Regulator 1 output of the Voltage Select Circuit (FIG. 7) at the non-inverting input of a dual operational amplifier 251 (VOLTAGE REF. IN.). Amplifier 251 may comprise, for example, a Motorola LM358 dual op-amp. The voltage input lever to amplifier 251 is amplified by a factor of 3.55 to produce the correct lever for Vref at the inverting input of an error amplifier 254. Amplifier 254 comprises, for example, a Motorola LM393 dual comparator circuit. A resistor R1 and a capacitor C1, connected between the output of amplifier 251 and the inverting input of amplifier 254, operate together as a noise filter for Vref.

As shown in FIG. 9, the lamp voltage (Vout) is divided down, and then received by a differential amplifier 252. Amplifier 252 may comprise, for example, a Motorola LM358 dual op-amp. A resistor R2 and a capacitor C2 operate together as a noise filter for the output of amplifier 252.

As shown in FIG. 9, an integrated circuit 259 contains circuitry at its right side to implement a Missing Pulse Detector 260, and circuitry at its left side to implement a pulse control circuit 268. The right side of IC 259 is a retriggerable one-shot circuit. IC 259 comprises, for example, a Motorola MC54/74HC4538 dual precision monostable multivibrator (retriggerable, resettable).

The output of error amplifier 254 is received by Missing Pulse Detector 260 through pin 12 of IC 259. The output of amplifier 254 is also received by an inverter 262, as shown in FIG. 9. Inverter 262 comprises, for example, a Motorola 74HC05 open drain inverter. Error amplifier 256 operates, with a voltage reference input Iref, to limit the amount of current flowing through a FET 258, the lamp, an inductor L and a capacitor C. Amplifier 256 comprises, for example, a Motorola LM393 dual comparator.

The output of amplifier 256 is normally a logic 1, provided that the voltage across a resistance 270 does not exceed Iref. The junction of the output of inverter 262 and the output of amplifier 256 is equivalent to an AND gate 264. The input of pulse control circuit 268 is located at pin 5 of IC 259. If either the output of amplifier 256 or inverter 262 drops to a logic 0, the input to pulse control circuit 268 drops to a logic 0. The output of pulse control circuit 268 is presented at pin 7 of IC 259. The output of Missing Pulse Detector 260 is defined at the output to an inverter 261 which has an input connected to pin 9 of IC 259, as shown in FIG. 9. Inverter 261 comprises, for example, a Motorola 74HC05 open drain inverter.

As shown in FIG. 9, the output of Missing Pulse Detector 260, pulse control circuit 268, inverter 262 and error amplifier 256 all enter a block 266 (in dash lines) and are connected to the input of an inverter 267. Block 266 constitutes an AND gate, and corresponds to AND gate 166 in FIG. 8. A high power inverter circuit 269 is connected between the output of inverter 267 and the gate electrode of FET 258. Inverter 269 is an Intersil ICL7667 high power inverter. If one of the outputs tied to the input of inverter 267 drops to a logic 0, FET circuit 258 is turned off.

Reset circuits (not shown), forming part of circuit 110 (FIG. 6), ensure that FET 258 is held off during power-up. The reset circuit provides a RESET signal to an inverter 272 as shown in FIG. 9. The RESET signal is active when it is at a logic 0. To initiate the reset function, a logic 0 input is provided to inverter 272. The logic 1 output of inverter 272 causes the outputs of an inverter 274 and an inverter 276 to drop to a logic 0. The logic 0 output of inverter 274 reduces Iref to 1/10 of its nominal value (e.g., 0.31 v vs. 0.03 v). In practice, the reduced value is typically closer to 0.07 v due to the output saturation voltage of inverter 274.

The logic 0 output of inverter 276 causes FET 258 to turn off. When the RESET signal rises to a logic 1, Iref is released and begins rising exponentially; and inverter 276 releases its mandatory off state for FET 258. As the output of inverter 272 is dropping to a logic 0, a negative going pulse is coupled into pin 11 of IC 259, through a resistor R3 and a capacitor C3. This pulse is received by Missing Pulse Detector 260 and forces the output of Missing Pulse Detector 260 to a logic 0, thus allowing regulator circuit 250 to be activated.

At start-up, the lamp has a very low resistance (essentially a short circuit). In order to preserve the lamps operating life, it is very desirable to limit the current flowing through the lamp at initial start-up. Initially, the current through FET 258 and the lamp is limited to about 1.5 amps (slightly less than ½ the rated current of the lamp), and the current limit is raised to its full value in 0.2 to 0.3 seconds. This time period is adequate for the lamp to heat up and increase its resistance.

With further reference to FIG. 9, a diode 278 (e.g., a MUR1530) protects FET 258 from excessive voltage generated by inductor L when FET 258 is turned off. Inductor L and capacitor C store energy and release it to the load during the time intervals that FET 258 is off. A ferrite bead 280, in conjunction with a 68 ohm resistor 282, provides some control over the turn-on and turn-off time periods of FET 258. Such control reduces large reverse currents through diode 278 and voltage spikes across resistance 270 that may occur when the FET turn-on period is too fast. Such control also reduces the amplitude of switching transients on the lamp voltage which are a potential source of electromagnetic radiation.

While the preferred embodiments of the invention have been particularly described in the specification and illustrated in the drawings, it should be understood that the invention is not so limited. Many modifications, equivalents and adaptations of the invention will become apparent to those skilled in the art without departing from the spirit and scope of the invention, as defined in the appended claims.

We claim:

1. An apparatus for printing a color image from a photographic transparency onto a photosensitive medium comprising:
   a plurality of light sources each providing light of a different color through a respective beam path when energized, the different color light of each of said light sources having a light intensity level established by an energizing level applied to the respective light source,
   means, disposed in the beam paths of said plurality of light sources, for selectively attenuating the intensity levels of each of said plurality of light sources to balance the different color light for compensation of said photographic transparency,
   means, optically coupled to said plurality of light sources, for combining the different colored light from said plurality of light sources to produce light of a composite color along a primary optical path,
   said photographic transparency being disposed along the primary optical path such that the composite color light passes through said photographic transparency and produces a projection of the color image from said photographic transparency,
   means, optically coupled to said photographic transparency, for electronically imaging the projected color image of said photographic transparency, said electronic imaging means having a characteristic spectral sensitivity response,
   means, optically coupled to said photographic transparency, for exposing said photosensitive medium with the projected color image, said photosensitive medium having a characteristic spectral sensitivity response, and
   means, coupled to said plurality of light sources, for energizing said plurality of light sources, said energizing means providing a first plurality of predetermined energizing levels to said plurality of light sources respectively to produce a first composite color light that substantially compensates for the sensitivity response of said electronic imaging means, said energizing means providing a second plurality of predetermined energizing levels to said plurality of light sources respectively to produce a second composite color light that substantially compensates for the sensitivity response of said photosensitive medium.

2. The apparatus as recited in claim 1, wherein said energizing means comprises
   means for switching between said first and said second pluralities of predetermined energizing levels such that said printing apparatus produces either said first composite color light or said second composite color light.

3. The apparatus as recited in claim 2, wherein said electronic imaging means comprises a video camera containing a CCD type imager.

4. The apparatus as recited in claim 3, wherein said photosensitive medium comprises photographic printing paper.

5. An apparatus as recited claim 4 wherein said second plurality of energizing levels are maximized to minimize the print time of said photographic paper.

6. A method of printing a color image from a photographic transparency onto a photosensitive medium comprising the steps of:
   energizing a plurality of light sources, each of said light sources providing light of a different color through a respective beam path, the different color light of each of said light sources having a light intensity level established by an energizing level applied to the respective light source,
   selectively attenuating the intensity levels of said different color light at the respective beam paths of said light sources to balance the different color light for compensation of said photographic transparency,
   combining the different colored light from said plurality of light sources to produce light of a composite color along a primary optical path,
   passing the composite color light through said photographic transparency to produce a projection of the color image from said photographic transparency,
   electronically imaging the projected color image of said photographic transparency with an electronic imaging means, said electronic imaging means having a characteristic spectral sensitivity response,
   exposing said photosensitive medium with the projected color image, said photosensitive medium having a characteristic spectral sensitivity response,
   said step of energizing said plurality of light sources further comprises
   providing a first plurality of predetermined energizing levels to said plurality of light sources respectively to produce a first composite color light that substantially compensates for the sensitivity response of said electronic imaging means, and
   providing a second plurality of predetermined energizing levels to said plurality of light sources respectively to produce a second composite color light that substantially compensates for the sensitivity response of said photosensitive medium.

7. The method as recited in claim 6, further comprising the step of
   independently attenuating the intensity levels of the different color light provided by each of said plurality of light sources such that said first and said second composite color lights can be balanced to compensate for the color image contained on said photographic transparency.

8. The method as recited in claim 7, wherein said step of energizing said plurality of light sources further comprises
   switching between said first and said second plurality of predetermined energizing levels such that either said first composite color light or said second composite color light is produced.

9. In a method of printing a color image from a photographic transparency onto photographic paper, said method being of the type wherein a plurality of light sources are energized to produce light of different colors along separate beam paths; and wherein the different color lights are balanced by attenuators disposed in the beam paths of said plurality of light sources; and wherein the different colored lights are combined to produce light of a composite color; and wherein the composite color light is passed through the photographic transparency to produce a projection of the color image; and wherein the projection is electronically imaged with a video camera; and wherein the photographic paper is exposed with the projection to print the color image thereon; the improvement comprising the steps of:

Applying a first plurality of predetermined energizing levels to said plurality of light sources respectively to produce a first composite color light that substantially compensates for the sensitivity response of said video camera;

applying a second plurality of predetermined energizing levels to said plurality of light sources respectively to produce a second composite color light that substantially compensates for the sensitivity response of said photographic paper; and applying said attenuators to compensate for the transmittance characteristics of the photographic transparency during the electronic imaging and the photographic printing.

* * * * *